United States Patent [19]

Abthoff et al.

[11] Patent Number: 4,824,363

[45] Date of Patent: Apr. 25, 1989

[54] PROCESS AND EQUIPMENT FOR REMOVING ODOROUS SUBSTANCES FROM THE FRESH AIR FOR VEHICLE CABINS

[75] Inventors: Joerg Abthoff, Pluederhausen; Hans-Dieter Schuster, Schorndorf; Karlwalter Schmidt, Weinstadt; Gottfried Wollenhaupt, Stuttgart; Hans-Georg Schmitz, Waiblingen, all of Fed. Rep. of Germany

[73] Assignee: Daimler-Benz Aktiengesellschaft, Stuttgart, Fed. Rep. of Germany

[21] Appl. No.: 654,251

[22] Filed: Sep. 25, 1984

[30] Foreign Application Priority Data

Sep. 28, 1983 [DE] Fed. Rep. of Germany ....... 3334992

[51] Int. Cl.[4] .............................. F24H 1/00; B60H 1/02
[52] U.S. Cl. ................................ 432/222; 237/12.3 C; 422/180; 98/2.05
[58] Field of Search ............... 122/4 D; 98/2.05, 2.11, 98/2.06, 2.08; 432/222; 422/180; 237/12.3

[56] References Cited

U.S. PATENT DOCUMENTS

| | | | |
|---|---|---|---|
| 2,551,823 | 5/1951 | Buttner et al. | 122/4 D |
| 2,658,742 | 11/1953 | Sutter et al. | 122/4 D |
| 3,110,300 | 11/1963 | Brown et al. | 122/4 D |
| 3,269,801 | 8/1966 | Boberg et al. | 98/2.11 |
| 3,883,637 | 5/1975 | Benedict | 98/2.11 |
| 4,007,875 | 2/1977 | Stolz et al. | 98/2.11 |
| 4,352,321 | 10/1982 | Fukui et al. | 98/2.11 |
| 4,363,787 | 12/1982 | Yoon | 422/180 |

FOREIGN PATENT DOCUMENTS 822053 11/1951 Fed. Rep. of Germany .
1957902 6/1970 Fed. Rep. of Germany .

*Primary Examiner*—Henry C. Yuen
*Attorney, Agent, or Firm*—Barnes & Thornburg

[57] ABSTRACT

A process and equipment for removing toxic and malodorous gases from the fresh air for vehicle cabins by catalytic oxidation, the process being based on passing the fresh air over a heating-system heat exchanger, the heat-emitting surfaces of which form the support for an oxidation catalyst. The heat exchanger used is the heating-system heat exchanger which is present in virtually all motor vehicles. In contrast to known solutions for purifying the fresh air, for example by means of activated carbon, the process is maintenance-free and does not require any additional constructional volume.

3 Claims, 1 Drawing Sheet

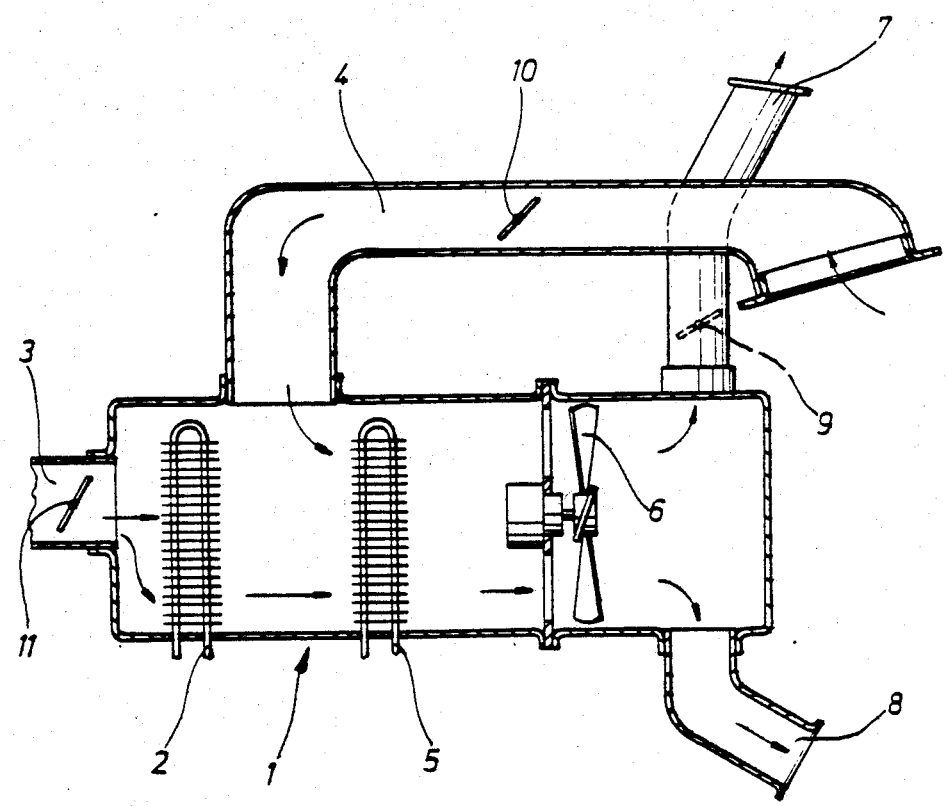

PROCESS AND EQUIPMENT FOR REMOVING ODOROUS SUBSTANCES FROM THE FRESH AIR FOR VEHICLE CABINS

Conventional heating and ventilation systems for motor vehicle cabins have the disadvantage that the outside air supplied to the cabin is virtually unpurified. In particular in town traffic and in winter, considerable odor nuisance is therefore caused sometimes by toxic and unpleasant gases and vapors in the air, which are contained, for example, in the exhaust gases of vehicles moving in front and are drawn in by the ventilation system. It has therefore already been proposed to purify the intake air on activated carbon filters (German Patent Specification No. 822,053) or, in addition to the purification by activated carbon, to convert those constituents of the air which cannot be adsorbed on the activated carbon, by means of an oxidation catalyst into substances adsorbable on the activated carbon (German Offenlegungsschrift No. 1,957,902). These types of equipment and processes have, however, the disadvantage that the size of the ventilation system increases markedly due to the installation of these additional filters, and this represents a considerable disadvantage in view of the limited space available in a motor vehicle.

It is an object of the invention to provide a process and apparatus for removing substance from an input to vehicle cabins.

It is an object of the invention to provide a process and apparatus for removing odorous substances from the fresh air for vehicle cabins by reaction on an oxidation catalyst, which process is simple and does not cause additional space requirements.

The support used for the oxidation catalyst, which oxidizes the toxic and odorous substances to harmless products, is the heat-emitting surface of the heating-system heat exchanger which is present in every motor vehicle. Examples of suitable catalysts, with which the heat-emitting surface of the heating-system heat exchanger is coated, are noble metals and metal oxides. Among these catalysts, those based on manganese dioxide or copper oxide are preferred, since they can operate at relatively low working temperatures.

The invention is not tied to the use of defined heat exchangers; rather, any conventional heating-system heat exchangers can be used.

The heat exchanger is usually connected to the cooling circulation of the engine. In some circumstances, however, it may be necessary to heat the air in the heat exchanger/catalyst combination more intensively in order to keep the required catalytic reaction going. In this case, the heat exchanger can also be heated in a manner known per se by the hot exhaust gases. Excessive heating of the vehicle cabin by the hot air can be avoided, for example, in such a way that the cabin air is circulated in a manner known per se and the fresh air supply is restricted to 10–20% of the circulated air rate, as is known from vehicle air-conditioning units and has already been described, for example, in a similar form in the quoted German Offenlegungsschrift No. 1,957,902. If the resulting temperature in the vehicle cabin should nevertheless rise unduly in accordance with the invention, further cooling of the air can be effected, in a manner known per se, in the evaporator of a normal heater/air-conditioning system. It is also possible in accordance with the invention first to precool the hot air in an air cooler, before it is admixed to the circulating stream or passed over a further cooling device.

The foregoing and other objects, features, and advantages of the present invention will become more apparent from the following description when taken in connection with the accompanying drawing which shows, for the purposes of illustration only, one embodiment in accordance with the present invention, and wherein the FIGURE shows an embodiment of the invention.

Turning to the FIGURE wherein like reference numerals represent like elements, the FIGURE that the fresh air to be supplied to the cabin is drawn in through the intake branch 3 of the air-conditioning system 1 by means of the fan 6. It passes through the heat exchanger 2, on the surface of which the toxic and malodorous constituents are oxidized and converted into harmless odorless substances. The heating of the heat exchanger 2 is not shown in more detail; it can, for example, be effected by the cooling circulation of the engine or by hot exhaust gases. Air from the vehicle interior is drawn in through the circulation duct 4, mixes with the fresh air deodorized on the heat exchanger 2 and then passes through a further heat exchanger 5. By means of this heat exchanger 5, which can be connected, for example, to a compression refrigeration machine, the air can be cooled further if necessary. The fan 6 then forces the air into the ducts 7 and 8, the duct 7 being used for defrosting the windscreen and the duct 8 leading into the interior of the vehicle. The duct 7 can be closed wholly or partially by means of a flap 9, so that the defrosting effect can be controlled in this way. Furthermore, a control flap 10 or 11 is provided in the circulation duct 4 and in the fresh air inlet line 3 respectively, by means of which the proportions of circulated air and fresh air can be controlled.

The advantages which can be obtained with the invention above all that deodoration and detoxification of the fresh air for the vehicle cabins can be carried out without further additional components. Moreover, the process and the equipment operate largely without maintenance, in contrast to the known installations in which a regular filter change is necessary.

While we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. Apparatus for removing odorous substances from fresh air for a vehicle cabin comprising
   a heat exchanger means for heating air to be conducted to the cabin and having a heat emitting surface with a catalyst thereon for oxidizing at least one pollutant from the mixture,
   means transmitting heat to said surface and catalyst for heating the mixture of air and pollutant,
   means for flowing said mixture of air and pollutants in contact with said heat emitting surface and catalyst, and
   means for introducing the air output from the heat emitting surface minus the oxidized pollutant to the vehicle cabin.

2. Apparatus in accordance with claim 1, wherein said means for catalyzing comprises a substance which is one of a noble metal and a metal oxide.

3. Apparatus in accordance with claim 2, wherein a metal oxide is one of manganese dioxide and copper oxide.

* * * * *